July 25, 1933.  L. H. CHURCH  1,919,826
METHOD OF FORMING THREADED BUSHINGS
Filed Sept. 15, 1931
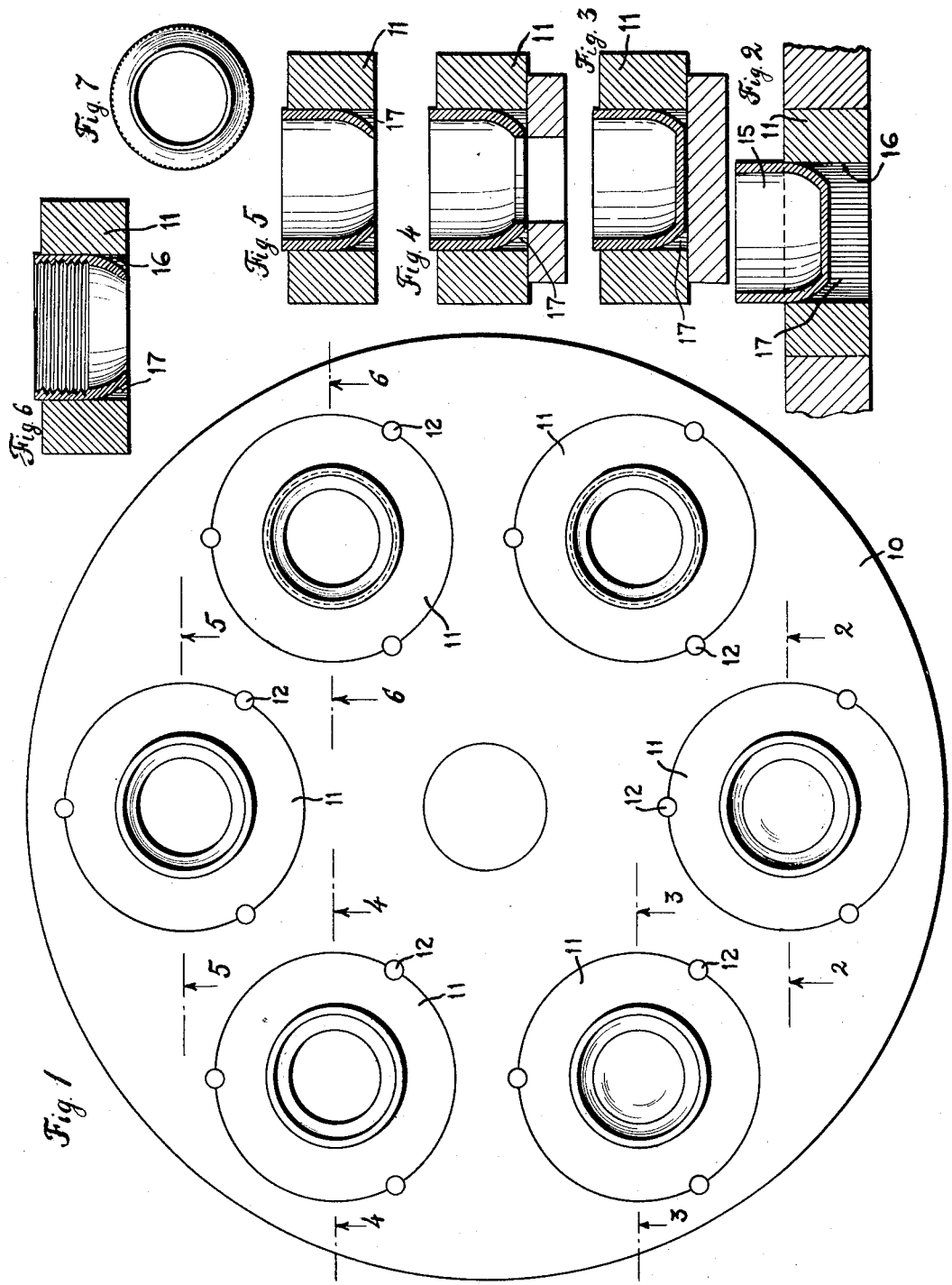
INVENTOR
LEWIS H. CHURCH
BY Bohleber & Ledbetter
ATTORNEYS Patented July 25, 1933

1,919,826

UNITED STATES PATENT OFFICE

LEWIS H. CHURCH, OF WESTFIELD, NEW JERSEY, ASSIGNOR TO THE THOMAS & BETTS CO., OF ELIZABETH, NEW JERSEY, A CORPORATION OF NEW JERSEY

METHOD OF FORMING THREADED BUSHINGS

Application filed September 15, 1931. Serial No. 562,879.

The invention relates to a method of finishing a coupler nut and the device by means of which the nut is both knurled and held. Coupler nuts are preferably punched into cup or sleeve shaped members from pressed steel, although the nuts may be formed in any other way. The invention pertains particularly to the method of forming the knurling upon the nut and then using the knurling device to hold the nut blank for further finishing operations.

An object of the invention is the method of forming the knurling upon the exterior surface of the coupler nut in a new and novel manner.

Another object of the invention is the method of forming the knurling upon the exterior of the coupler nut by forcing the nut blank into a die having cutting teeth within the bore of the die which cutting teeth form the knurls upon the exterior surface of the coupler nut and subsequently performing additional finishing operations such as punching or otherwise cutting out the bottom if the blank is cup-shaped, facing and chamfering, tapping, and removing the nut from the die, while the nut is held by the knurling upon the nut and the teeth of the die.

A further object is to construct a device for knurling the nut blank which also serves as a holding chuck for subsequent operations.

Other objects of the invention will be more apparent from the following description taken in connection with the accompanying drawing in which:

Figure 1 is a plan view of a rotatable plate having a plurality of knurling dies so that a finishing operation may be performed in each position or station upon the plate.

Figure 2 is a cross-section through the plate and a knurling die taken on line 2—2 of Figure 1 showing the die and a blank nut positioned thereupon just before being forced into the die.

Figure 3 shows the second finishing operation or station of the rotatable plate in which position the cup is forced into the die.

Figure 4 corresponds with the third position upon the plate where the cup is pierced through the bottom and the cross-section is shown through the die in this position.

Figure 5 shows the nut blank in position or station 4 where the coupler nut is faced and chamfered.

Figure 6 shows the fifth operation station of the plate where the coupler nut is threaded.

Figure 7 is an end view of the finished coupler nut.

Coupler nuts which are used in large quantities in electrical conduit systems are very cheaply manufactured if formed from punchings, which punchings or blanks are cup-shaped or formed as sleeves and are subsequently finished to form a completed threaded coupler nut. Usually such coupler nuts have been formed by knurling the exterior surface of the coupler nut with a usual knurling tool and afterward gripping the coupler nut blank in a chuck and performing the other operations necessary to form the completed nut. By the method and devices of the invention the knurling is formed in a die and the coupler nut blank remains in the die for the remaining operations to be performed in order to form a completed coupler nut. The devices which form the knurling within the die therefore also serve as a holding or securing means for the subsequent operations upon the coupler nut.

The rotatable or die plate 10 shown in Figure 1 is provided with a plurality of dies 11 which are removable but adapted to be held in spaced position upon the plate. There are six such dies shown upon the plate which correspond to the six operating stations or positions upon the die plate. It is clear that any number of such stations may be provided, depending upon the number of operations to be performed upon the coupler nut, so that more or less than six stations and dies may be provided as desired. The dies 11 are retained in position in any known manner such as by the pins or keys 12 in a manner known to the art.

The coupler nut blank 15 is preferably punched from sheet material and hence is cup-shaped. The device and the method of finishing nuts to be described herein is adapted for use with any shell or cup-shaped blank whether formed by punching or any other suitable method. Since the method of forming or punching the blank is not a part of this invention, it will not be further discussed herein.

The die 11 has an opening or bore 16 therein which corresponds with the shape or form of the blank 15. A plurality of teeth 17 are formed upon the inside bore 16 of the die 11 which teeth are hard and project beyond the walls of the interior bore 16 of the die 11 so that the inside diameter over the points of the teeth is less than the outside diameter of the blank 15. The blank 15 upon being forced into the bore 16 in the die 11, the teeth 17 cut knurling grooves into the outer surface of the cup 15. The cup-shaped blank 15 is left within the die 11 and the teeth being embedded within the outer surface of the blank form a gripping means for holding the cup blank 15 against rotation for subsequent operations thereupon. It will be apparent that not only does the die, with its teeth, form the knurls upon the exterior surface of the coupler nut blank but they also form gripping or holding means for the blank during the subsequent finishing operations to be performed upon the blank.

Where a cup-shaped blank 15 is used, the bottom of the cup is punched therefrom, and this operation may be performed in station 3 or the third position upon the plate, the knurling being the second station or operation. The punching out of the end of the cup may be performed by punches as is well known in the art, or it may be drilled, bored or otherwise cut out and if cut out, the teeth in the die, by being embedded within the grooves or knurls formed in the outer periphery of the nut, hold the blank 15 against rotation while the bottom is being cut through.

In position or operation 4, the coupler nut blank may be subjected to a facing and chamfering operation. Obviously this operation is not necessary and may be eliminated if desired. It does however provide a squared off end for the coupler nut and also chamfers the end of the nut so that the threading tap may be easily started within the coupler nut. The bottom of the nut may be smoothed off also if desired.

The coupler nut is threaded in position 5 which may be formed by the usual threading tap as is well known to the art. In this operation the coupler nut blank is subjected to a strong turning force but the teeth 17 on the die by being embedded in the grooves formed thereby in the surface of the coupler nut, securely hold the blank within the die against rotation. After the threading or tapping operation is performed the finished blank is ejected from the die in position 6 by an ejector pressing the finished coupler nut out of the die 11.

The various finishing operations may be performed upon the known devices such as a drill press having a plurality of spindles with a tool in each spindle and in the preferred manufacture, the spindles are arranged circularly in the same position as the dies so that all the operations are performed at the same time. The die plate 10 is then rotated one position and then all the operations are again performed at the same time. Obviously, the finishing operations may be performed equally well on any machine having a plurality of spindles, one spindle being provided for each operation performed.

It will be observed, therefore, that the invention contemplates the formation of knurling or grooves in the outer surface of the coupler nut and that these knurls are formed by teeth provided in a die so that when the coupler nut blank is forced within the die the teeth form the grooves within the surface of the coupler nut and in addition thereto, the teeth by being embedded within the grooves, grip the nut blank for subsequent operations and securely hold the coupler nut blank against movement or rotation with the die. It is immaterial what subsequent operations are performed upon the blank although in the manufacture of coupler nuts as in this invention, the subsequent operations include drilling or punching, chamfering and facing, tapping and then the ejection of the blank from the die.

Various modifications will occur to those skilled in the art in the configuration, composition and disposition of the component elements going to make up the invention as a whole, as well as in the selective combination or application of the respective elements, and no limitation is intended by the phraseology of the foregoing description or illustrations in the accompanying drawing, except as indicated in the appended claims.

What is claimed is:

1. A method of finishing a cylindrical coupler nut blank having a thin wall comprising forcing the coupler nut blank into a die having cutting teeth disposed circumferentially within the die for a substantial distance which teeth cut into the surface of the cylindrical nut blank and form knurls, holding the nut blank with the teeth of the die, performing finishing operations upon the nut blank while held within the die, and removing the finished nut from the die.

2. A method of finishing a cylindrical coupler nut blank having a thin wall comprising forcing the coupler nut blank into a die having cutting teeth disposed circumferentially within the die for a substantial distance which teeth cut into the surface of the cylindrical nut blank and form knurls, holding the nut blank with the teeth of the die, then tapping the nut blank while in the die and gripped by the teeth, and then removing the finished nut from the die.

3. A method of finishing a cup-shaped and cylindrical coupler nut blank having a thin wall comprising forcing the coupler nut blank into a die having cutting teeth disposed circumferentially within the die for a substantial distance which teeth cut into the surface of the cylindrical nut blank and form knurls, holding the nut blank with the teeth of the die, cutting the bottom from the cup-shaped nut blank while held within the die, and removing the finished nut from the die.

4. A method of finishing a cylindrical coupler nut blank having a thin wall comprising forcing the coupler nut blank into a die having cutting teeth disposed circumferentially within the die for a substantial distance which teeth cut into the surface of the cylindrical nut blank and form knurls, holding the nut blank with the teeth of the die, chamfering and facing the nut blank, and removing the finished nut from the die.

5. A method of finishing a cylindrical coupler nut blank having a thin wall comprising forcing the coupler nut blank into a die having cutting teeth disposed circumferentially within the die for a substantial distance which teeth cut into the surface of the cylindrical nut blank and form knurls, holding the nut blank with the teeth of the die, chamfering and facing the nut blank, then tapping the nut blank, and removing the finished nut from the die.

6. A method of finishing a cylindrical coupler nut blank having a thin wall comprising forcing the coupler nut blank into a die having cutting teeth disposed circumferentially within the die for a substantial distance which teeth cut into the surface of the cylindrical nut blank and form knurls, holding the nut blank with the teeth of the die, cutting the bottom from the nut blank, tapping the nut blank, and removing the finished nut from the die.

7. A method of finishing a cylindrical coupler nut blank having a thin wall comprising forcing the coupler nut blank into a die having cutting teeth disposed circumferentially within the die for a substantial distance which teeth cut into the surface of the cylindrical nut blank and form knurls, holding the nut blank with the teeth of the die, cutting the bottom from the nut blank, chamfering and facing the nut blank, and removing the finished nut from the die.

8. A method of finishing a cylindrical coupler nut blank having a thin wall comprising forcing the coupler nut blank into a die having cutting teeth disposed circumferentially within the die for a substantial distance which teeth cut into the surface of the cylindrical nut blank and form knurls, holding the nut blank with the teeth of the die, cutting the bottom from the nut blank, chamfering and facing the nut blank, tapping the nut blank, and removing the finished nut from the die.

LEWIS H. CHURCH.